UNITED STATES PATENT OFFICE.

MARC DARRIN, OF WILKINSBURG, PENNSYLVANIA, ASSIGNOR TO KOPPERS PRODUCTS COMPANY, A CORPORATION OF PENNSYLVANIA.

LINSEED-OIL SUBSTITUTE.

1,382,345.     Specification of Letters Patent.     Patented June 21, 1921.

No Drawing.     Application filed February 7, 1920. Serial No. 357,029.

*To all whom it may concern:*

Be it known that I, MARC DARRIN, a citizen of the United States, residing at Wilkinsburg, Allegheny county, Pennsylvania, have invented a new and useful Improvement in Linseed-Oil Substitutes, of which the following is a full, clear, and exact description.

The present invention relates broadly to oils and more particularly to an oil intended for use as a substitute for linseed oil.

An important object of the present invention is to provide a substitute for linseed oil having certain advantages over linseed oil due to chemical inertness, resistance to the action of alkalis, and electrical insulating properties.

Another important object of the invention is to provide a substitute of this type which may be inexpensively produced as compared to linseed oil, due to the comparatively low cost of the various ingredients employed.

The chief ingredients used in the manufacture of my linseed oil substitute are coumarone resin, coal tar oils, drying or semi-drying paint and petroleum oils. Any variety of coumarone resin may be used, either an acid polymerized or a heat polymerized type. It is understood that by coumarone resin I refer to the general coumarone type which includes indene resin and also certain proportions of related resins which are usually produced in conjunction with coumarone and indene resins, such, for example, as polymerized styrolene and polymerized dicyclopentadiene, also the polymerized homologues of coumarone such as polymerized methyl coumarone, polymerized dimethyl coumarone, etc.

Regarding the coal tar oils, it is preferable to employ a benzol product of the solvent naphtha variety. Such a product serves to bring the resin into solution and to keep the resin in solution after the addition of other ingredients. In the process of manufacture of coumarone resins these resins are usually in solution in solvent naphtha from which the resins are separated in a later operation by distillation. For the purpose of my invention it is not always necessary to separate this solvent naphtha from the resins. In many cases the resins and the solvent naphtha occur in suitable proportions for using in my linseed oil substitute. Sometimes, however, when the resins are produced from certain crude materials there are small amounts of volatile impurities present which impart an undesirable odor. In this case it is best to separate the resins from the impure solvent naphtha by a distillation process, and then to incorporate the resin with a purified solvent naphtha.

For the vegetable oils, I prefer to use either linseed oil, China wood oil, soy bean oil, Perilla oil, cottonseed oil, or the like, or a combination of these oils. The addition of such paint oils in amounts from 10% to 50% by volume imparts an odor and general properties to the material which is desirable in many instances. In some cases the odor of the material can be changed very materially by the addition of certain volatile oils, as for instance, I have found that the addition of certain of the light boiling wood distillation oils, serve admirably to disguise the solvent naphtha odor. Although the odor of solvent naphtha is not injurious in itself, the average painter is prejudiced against odors with which he is not familiar.

Regarding the petroleum oils, I have not always found it essential to incorporate such oils in my linseed oil substitute, but the use of such an oil lessens the cost of the product and can be used to advantage in certain cases where a particularly hard drying product is not required. It will be apparent that the amount of petroleum oil employed, if any, may vary considerably.

The following formula I have found very suitable:

40 parts coumarone resins,
40 parts solvent naphtha,
20 parts linseed or other oils or combinations thereof.

Of course it is understood that proportions can be varied within wide limits and many other materials may be used in addition to those mentioned above without departing from the essence of my invention, such as petroleum oils, together with volatile wood distillation oils for purpose of improving the odor, etc.

I claim:

1. A liquid mixture including a solution of heat polymerized coumarone resins in a solvent naphtha and a paint.

2. A liquid mixture including a solution of coumarone resins, in solvent naphtha and linseed oil.

3. A linseed oil substitute comprising a solution of a heat polymerized coumarone resin.

4. A linseed oil substitute comprising a solution of a heat polymerized coumarone resin, and a paint oil.

5. A linseed oil substitute comprising a solution of a heat polymerized coumarone resin, a paint oil and a volatile oil serving as a deodorant.

6. A linseed oil substitute comprising a solution of heat polymerized coumarone resins in solvent naphtha.

7. A linseed oil substitute comprising a solution of heat polymerized coumarone resins in solvent naphtha and a paint oil.

8. A linseed oil substitute comprising a solution of heat polymerized coumarone resins in solvent naphtha, a paint oil and a petroleum oil.

9. A linseed oil substitute comprising a solution of coumarone resins in solvent naphtha and linseed oil.

10. A linseed oil substitute comprising a solution of coumarone resins in solvent naphtha, linseed oil and a volatile oil serving as a deordorant.

11. An oil substitute comprising in solution coumarone resins, solvent naphtha, and a deodorant.

12. An oil substitute comprising in solution coumarone resins, solvent naphtha, a paint oil, and a petroleum oil.

In testimony whereof, I have hereunto set my hand.

MARC DARRIN.

It is hereby certified that in Letters Patent No. 1,382,345, granted June 21, 1921, upon the application of Marc Darrin, of Wilkinsburg, Pennsylvania, for an improvement in "Linseed-Oil Substitutes," an error appears in the printed specification requiring correction as follows: Page 1, line 107, claim 1, after the word "paint" insert the word *oil;* and that the said Letters Patent should be read with this correction therein that the same may conform to the record of the case in the Patent Office.

Signed and sealed this 30th day of August, A. D., 1921.

[SEAL.]

KARL FENNING,

*Acting Commissioner of Patents.*

Cl. 134—56.